United States Patent
Mester et al.

(10) Patent No.: US 12,260,527 B2
(45) Date of Patent: Mar. 25, 2025

(54) SYSTEMS AND METHODS FOR RENDERING A VIRTUAL ENVIRONMENT USING LIGHT PROBES

(71) Applicant: Unity Technologies ApS, Copenhagen (DK)

(72) Inventors: Yuping Zhang Mester, Snoqualmie, WA (US); Jeremy Weston Cowles, Berkeley, CA (US); Natalya Tatarchuk, Kirkland, WA (US)

(73) Assignee: Unity Technologies ApS, Copenhagen (DK)

( * ) Notice: Subject to any disclaimer, the term of this patent is extended or adjusted under 35 U.S.C. 154(b) by 441 days.

(21) Appl. No.: 17/859,927

(22) Filed: Jul. 7, 2022

(65) Prior Publication Data
US 2023/0011650 A1    Jan. 12, 2023

Related U.S. Application Data

(60) Provisional application No. 63/203,092, filed on Jul. 7, 2021.

(51) Int. Cl.
*G06T 5/70*    (2024.01)
*G06T 7/50*    (2017.01)

(52) U.S. Cl.
CPC .............. *G06T 5/70* (2024.01); *G06T 7/50* (2017.01); *G06T 2207/20084* (2013.01)

(58) Field of Classification Search
CPC ... G06T 5/70; G06T 7/50; G06T 2207/20084; G06T 19/00; G06T 15/506
See application file for complete search history.

(56) References Cited

FOREIGN PATENT DOCUMENTS

CN    110599413 A   * 12/2019   .......... G06K 9/6287

OTHER PUBLICATIONS

"European Application Serial No. 22183673.7, Extended European Search Report mailed Jan. 16, 2023", 8 pgs.
Hu, Jinhan, et al., "Sensor-realistic Synthetic Data Engine for Multi-frame High Dynamic Range Photography", 2020 IEEE/CVF Conference on Computer Vision and Pattern Recognition Workshops (CVPRW), IEEE, (Jun. 14, 2020), 2180-2189.
Somanath, Gowri, et al., "HDR Environment Map Estimation for Real-Time Augmented Reality", IEEE/CVF Conference on Computer Vision and Pattern Recognition, (Jun. 20, 2021), 11293-11301.
Wang, Yifan, et al., "People as Scene Probes", arXiv:2007.09209, (Jul. 17, 2020), 24 pgs.

* cited by examiner

*Primary Examiner* — Carol Wang
(74) *Attorney, Agent, or Firm* — Schwegman Lundberg & Woessner, P.A.

(57) ABSTRACT

Methods, systems, and computer-readable media for rendering light probes in a virtual environment are disclosed. Noisy lighting data is accessed in a data structure associated with a light probe in a set of light probes in an environment. The noisy lighting data is provided as an input to a neural network. The neural network is trained to output an estimate of non-noisy lighting data based on the input. The noisy lighting data is replaced in the data structure with the estimated non-noisy lighting data.

20 Claims, 7 Drawing Sheets

100

```
┌─────────────────────────────────────────────────────────────┐
│ COMPUTE A NOISY LIGHTING DATA REPRESENTATION FOR A SET      │
│ OF LIGHT PROBES IN AN ENVIRONMENT USING AN OPTICAL          │─102
│ SIMULATION METHOD (E.G., UNBIASED MONTE CARLO PATH          │
│ TRACER) (E.G., USING A LOW SAMPLE COUNT PER PROBE)          │
└─────────────────────────────────────────────────────────────┘
                              │
                              ▼
┌─────────────────────────────────────────────────────────────┐
│ THE NOISY LIGHTING DATA REPRESENTATION IS PROJECTED         │─104
│ INTO A SPHERICAL HARMONIC SPACE AND BUNDLED WITH THE        │
│ VALIDITY DATA                                               │
└─────────────────────────────────────────────────────────────┘
                              │
                              ▼
┌─────────────────────────────────────────────────────────────┐
│ GENERATE A DATA BUFFER (E.G., COMPUTE BUFFER) INCLUDING     │─106
│ THE NOISY LIGHTING DATA (E.G., NOISY SH COEFFICIENTS) AND   │
│ ASSOCIATE THE BUFFER WITH THE SET OF LIGHT PROBES           │
└─────────────────────────────────────────────────────────────┘
                              │
                              ▼
┌─────────────────────────────────────────────────────────────┐
│ A DEEP NEURAL NETWORK USES THE COMPUTE BUFFER AS            │─108
│ INPUT TO PRODUCE DENOISED LIGHTING DATA (E.G., DENOISED     │
│ COEFFICIENTS) FOR THE LIGHT PROBE. DEPTH ESTIMATIONS        │
│ BETWEEN A LIGHT PROBE IN THE SET AND A NEAREST SURFACE      │
│ OF AN OBJECT IN THE ENVIRONMENT MAY ALSO BE INPUT           │
└─────────────────────────────────────────────────────────────┘
                              │
                              ▼
┌─────────────────────────────────────────────────────────────┐
│ REPLACE THE NOISY LIGHTING DATA (E.G., COEFFICIENTS) IN     │─110
│ THE LIGHT PROBES WITH THE DENOISED LIGHTING DATA FROM       │
│ THE DEEP NEURAL NETWORK                                     │
└─────────────────────────────────────────────────────────────┘
                              │
                              ▼
┌─────────────────────────────────────────────────────────────┐
│ RENDER A SCENE FROM THE ENVIRONMENT USING THE               │─112
│ DENOISED LIGHTING DATA IN THE SET OF LIGHT PROBES           │
└─────────────────────────────────────────────────────────────┘
```

SYSTEMS AND METHODS FOR RENDERING A VIRTUAL ENVIRONMENT USING LIGHT PROBES

CROSS-REFERENCE TO RELATED APPLICATIONS

This application claims the benefit of U.S. Provisional Application No. 63/203,092, filed Jul. 7, 2021, entitled "SYSTEMS AND METHODS FOR RENDERING A VIRTUAL ENVIRONMENT USING LIGHT PROBES," which is incorporated by reference herein in its entirety.

TECHNICAL FIELD

The subject matter disclosed herein generally relates to the technical field of computer graphics systems, and in one specific example, to computer graphics systems and methods for rendering graphics using neural networks and light probes.

BACKGROUND OF THE INVENTION

Placing light probes in a virtual scene allows for the capture and use of light information passing through the probes within an empty space in the scene. At a subsequent time, the captured light information may be used by a rendering pipeline to improve a rendering of the scene. For example, based on the scene including a moving object, the captured light information stored in the light probes may be used to determine an approximation of light bouncing around the scene based on a position of the moving object. However, while light probes are beneficial for global illumination, existing methods are expensive; for example, they may require the pre-computation and storage of millions of light ray paths to reach a converged result.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

Methods, systems, and computer-readable media for rendering light probes in a virtual environment are disclosed. Noisy lighting data is accessed in a data structure associated with a light probe in a set of light probes in an environment. The noisy lighting data is provided as an input to a neural network. The neural network is trained to output denoised lighting data or an estimate of non-noisy lighting data based on the input. The noisy lighting data is replaced in the data structure with the estimated non-noisy lighting data. A scene is rendered in the environment using the denoised lighting data associated with the light probe.

The present invention includes apparatuses which perform one or more operations or one or more combinations of operations described herein, including data processing systems which perform these operations and computer readable media which when executed on data processing systems cause the systems to perform these operations, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to users (e.g., artists, game developers, and the like): the systems and methods described herein improve the quality of global illumination (GI) when rendering a 3D scene by generating higher quality lighting with a smaller number of light paths when compared to other systems and methods, or, alternatively, by generating higher quality lighting with a same amount of light paths when compared to other systems and methods. Furthermore, the systems and methods described herein may reduce production costs for content creation (e.g., by reducing an amount of light simulation) via a neural network (e.g., trained as described herein) that uses noisy 3D volume pre-computed light simulation coefficients as an input to produce an approximation of smooth high quality coefficients. This process allows users to obtain higher quality lighting at a same cost (e.g., either computational cost or production cost) when compared to other systems or methods, or generate a same quality of lighting at lower cost when compared to other systems and methods. In addition, the systems and methods described herein speed up content creation, including environments for real-time scenarios because of the reasons aforementioned and by significantly reducing a time required to generate baked GI due to the use of the noisy light simulation coefficients which can be produced with low computational cost.

Figure 1:
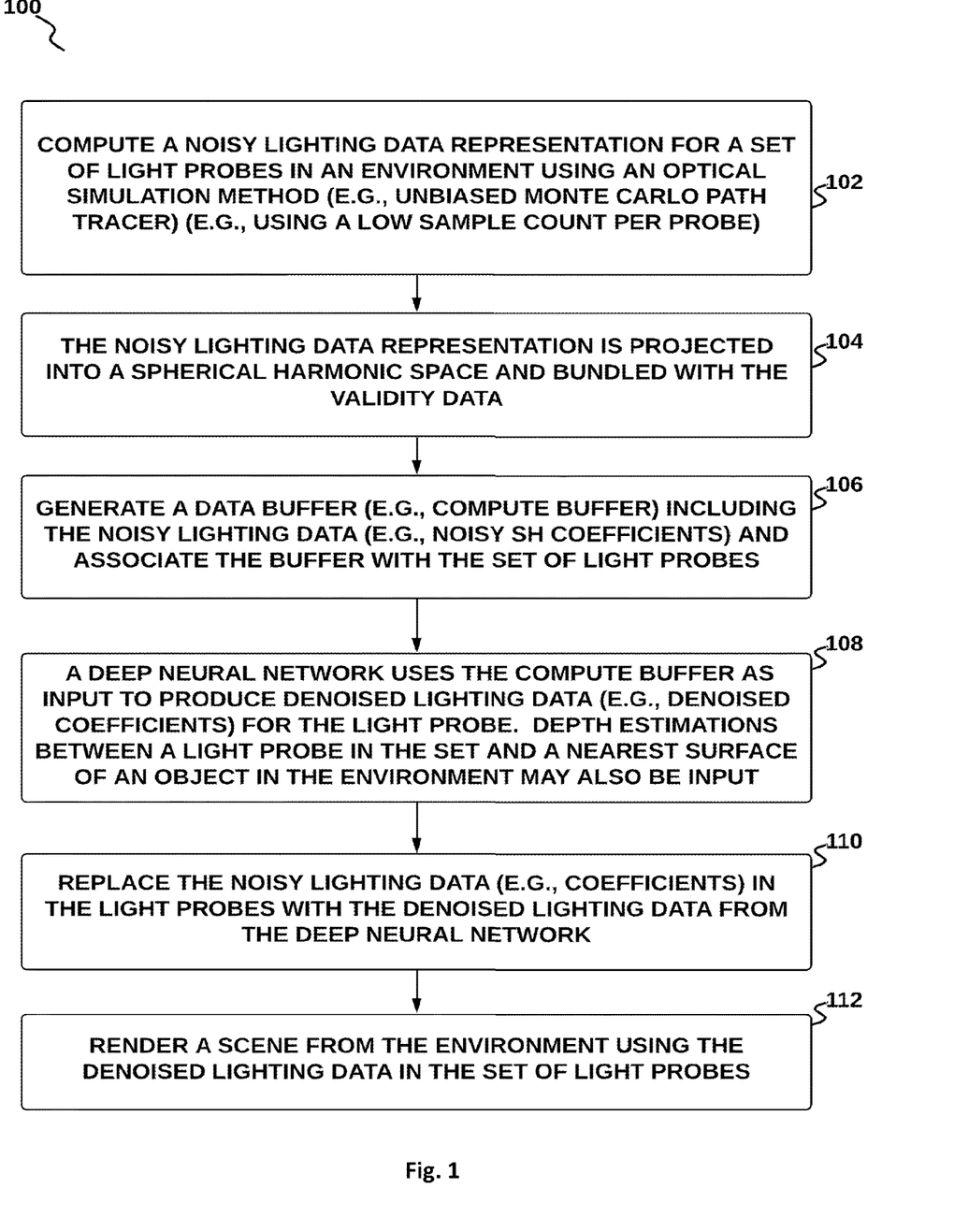
FIG. 1 is a flowchart of a method for creating denoised coefficients in a set of light probes, in accordance with one embodiment.
Figure 4:
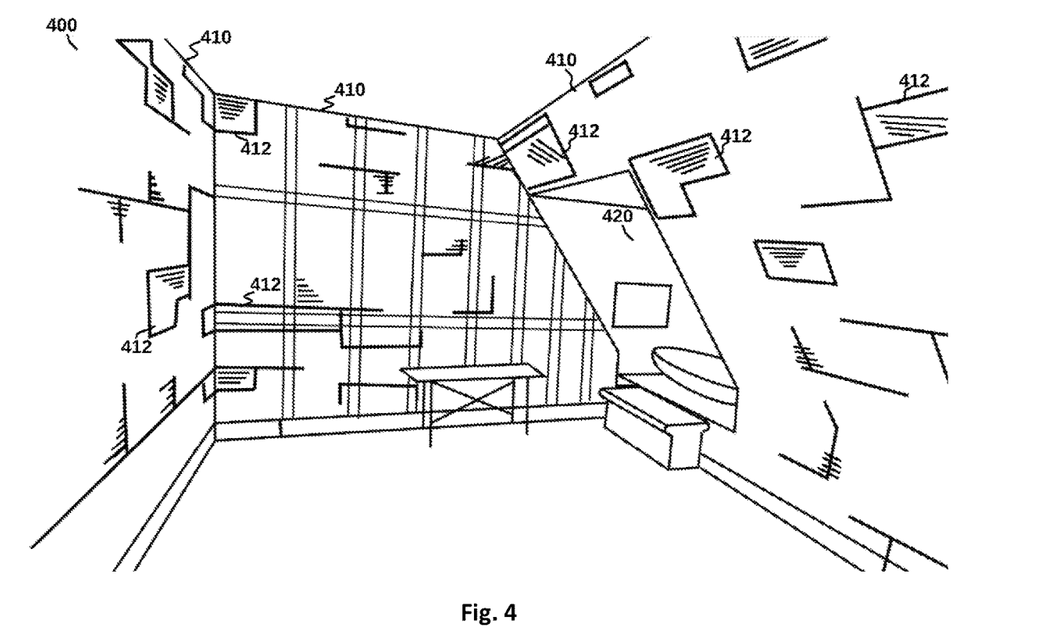
FIG. 4 is an illustration of an example image rendered from noisy input lighting data, in accordance with one embodiment.

Turning now to the drawings, systems and methods, including non-routine or unconventional components or operations, or combinations of such components or operations, for light probe denoising in accordance with embodiments of the invention are illustrated. In accordance with an embodiment, FIG. 1 shows a flowchart of a method 100 for generating denoised coefficients in light probes within a 3D environment. The method 100 may generate a high quality data representation of light passing through a probe volume (e.g., a volume represented by a plurality of light probes) in a 3D scene, based on a low quality data representation of light passing through the probe volume. In accordance with an embodiment, a probe within the probe volume may be a point or a small volume within the scene. The low quality data representation may include light information (e.g., a mathematical representation of light information such as light function coefficients) which is generated at a low computational complexity during a simulation of lighting (e.g., light transport) within the 3D scene. For example, the low quality data representation referred to herein as 'noisy light data representation' may be generated during a light transport simulation by using a low density of simulated light rays within the 3D scene. More specifically, the noisy light data representation includes light information which is below a configurable amount of light information density (e.g., light ray density) and/or accuracy (e.g., light function coefficient accuracy). For example, noisy light data representation may be generated during simulation with a configurable amount of simulated light ray density which is below a quality threshold. In accordance with an embodiment, the threshold may be chosen such that noisy light data representation produces (e.g., when rendered) a noisy output image which may not have physically correct lighting and shadows or may have rough global illumination (e.g., as shown in FIG. 4) wherein shadows may be jagged and out of place. In other embodiments, the quality threshold may be determined by limiting a baking time.

Figure 5:
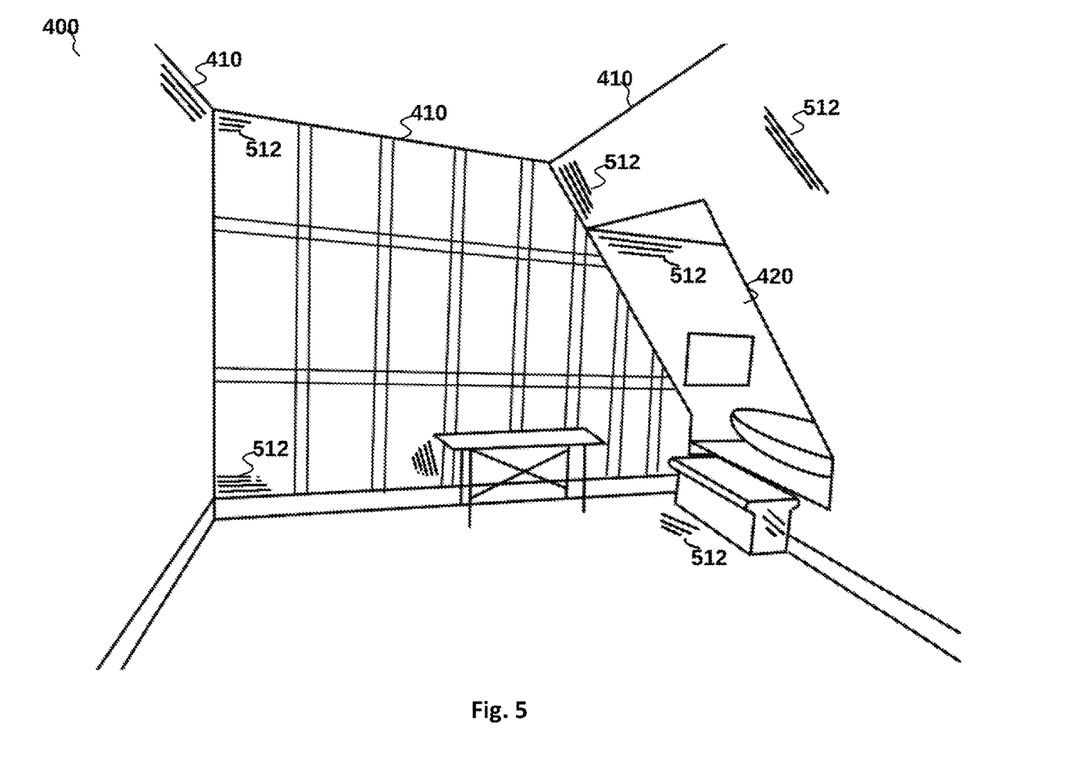
FIG. 5 is an illustration of an example image rendered from denoised output lighting data, in accordance with one embodiment.

Similarly, the high quality light data representation (e.g., the denoised light data representation) includes light information which is above a configurable amount of light information density (e.g., light ray density) and/or accuracy (e.g., light function coefficient accuracy). For example, denoised or high quality light data representation may be generated during simulation with a configurable amount of simulated light ray density which is above a quality threshold. In accordance with an embodiment, the threshold may be chosen such that the denoised light data representation produces (e.g., when rendered) a high quality (e.g., denoised) output image which may have smooth global illumination (e.g., as shown in FIG. 5) which may be smooth and physically correct (e.g., photorealistic).

In various embodiments, some of the method elements shown in FIG. 1 may be performed concurrently, in a different order than shown, or may be omitted. The method 100 may be used in conjunction with a light probe denoising system (e.g., via a light probe denoising module 644) as described with respect to FIG. 6 and FIG. 7.

In accordance with an embodiment, at operation 102 of the method 100, an optical simulation method is used to compute a noisy lighting data representation for a set of light probes in an environment (e.g., within a 3D scene). In accordance with an embodiment, the optical simulation method may use light transport methods to simulate realistic lighting (e.g., global illumination) within a volume (e.g., or surface or point) associated with a light probe within the set of light probes. The optical simulation method may include path tracing, ray tracing, photon mapping or other methods to determine lighting at a light probe. In some embodiments, statistically unbiased optical simulation methods (e.g., such as path tracing) which do not introduce systematic error may provide more benefit (e.g., a higher quality rendered output) when used in the light probe denoising method 100, as compared to statistically biased methods (e.g., ray tracing). For example, the optical simulation method may use an unbiased Monte Carlo path tracer method which integrates over all illuminance arriving at a single point on the surface of a light probe in order to determine the noisy lighting data representation, wherein the integration includes using a rendering equation and the bidirectional reflectance distribution function (BRDF).

In accordance with an embodiment, the noisy lighting data representation may include coefficients to a numerical solution of a rendering equation. The noisy lighting data representation may represent light radiance (e.g., light leaving the probe), light irradiance (e.g., incoming light), or both. In accordance with an embodiment, data within the noisy lighting data representation may be of low quality (e.g., noisy), due to a use of low sample counts during a simulation of the light field data by the optical simulation method. In example embodiments, quality of the data may be based on a quality score associated with the data. The quality score may be based on a sample count and/or statistical data (e.g., a variance of the sample mean or standard error) associated with the sample data and/or any other quality metric described herein. For example, a higher quality score may be associated with a higher sample size and/or lower standard error. If the quality score is less than a predetermined and/or configurable quality threshold value, the quality of the data may be identified as being of low quality.

In accordance with an embodiment, the noisy lighting data representation may include traced paths (e.g., based on a use of a path tracer method), validity data, and distance estimation values (e.g., or depth estimation values). An "invalid" probe may be a probe that is either fully or partially inside of geometry within the 3D scene (e.g., and therefore cannot contribute to light calculations within the scene). Each probe may have a corresponding validity probability that may be associated with a number of sample rays that hit a backface of a geometry for which the probe is in contact with, or is within. Accordingly, based on a probe being fully inside of an object, a validity value associated with the probe may be zero; similarly based on a probe being halfway embedded in an object (e.g., a floor), an associated validity value may be 0.5 (50%). In accordance with an embodiment, validity and depth may be computed by tracing rays in various directions, wherein the validity and depth values may be represented by functions on the surface of a probe (e.g., spherical functions for a probe in the shape of a sphere). For example, based on a probe being embedded in the floor, a function of validity value on a non-occluded part of the sphere may be 1.0 while an occluded part (e.g., embedded in the floor) may be 0.

In accordance with an embodiment, the distance estimates (e.g., depth estimates) represent a measure of a distance between a probe and a nearest surface on an object within the environment. There may be a plurality of values associated with a probe, the plurality of values representing a plurality of distances from the probe to a plurality of objects within the environment. As an example, in accordance with an embodiment, the plurality of objects may be background objects within an environment and the noisy lighting data may be a determination of noisy lighting data for a background scene.

Figure 3:
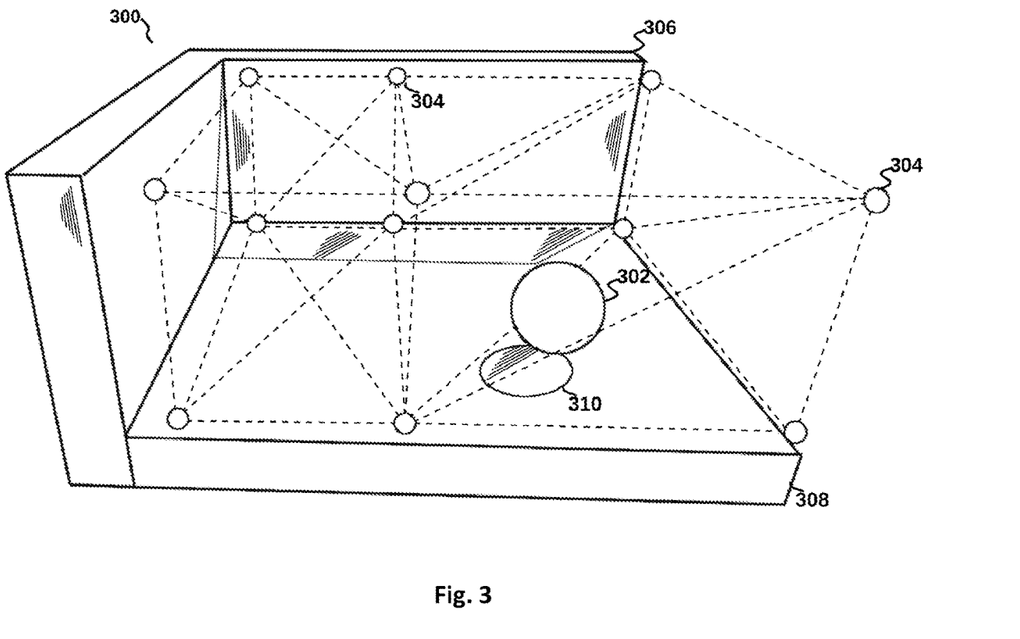
FIG. 3 is an illustration of an object in a scene surrounded by a set of light probes, in accordance with one embodiment.

In accordance with an embodiment, a positioning of the set of light probes (e.g., the probe volume) may be predetermined (e.g., probes may be positioned by a human, or positioned according to rules, a function, an artificial intelligence agent, or the like). The positioning of the set of light probes may be chosen to capture an optimum coverage of lighting information within the 3D scene. In accordance with an embodiment, an optimum coverage may include a positioning of a minimum number of light probes in order to produce photorealistic results or smooth global illumination. In accordance with an embodiment, light probe placement density may vary within a 3D scene, being more dense in some volumes, and less dense in others. For example, in accordance with an embodiment, light probe placement density may be high within a first volume of the 3D scene based on the first volume being an important region of the 3D scene (e.g., a street within a racing game) and light probe placement density may be low within a second volume of the 3D scene based on the second volume being a less important region of the 3D scene (e.g., background buildings along a racing path within a racing game). An example positioning of a set of probes is shown in FIG. 3. While an example positioning of light probes is shown in FIG. 3, it should be understood that any light probe position configuration (e.g., any number of light probes in any configuration within a probe volume) may be used with the method 100 without departing from the scope of the disclosure herein.

In accordance with an embodiment, at operation 104 of the method 100, the determined noisy lighting data representations may be projected onto a second data representation space for ease of computation during rendering (e.g., during operation 112). For example, the determined noisy lighting data representations (e.g., which may include traced paths, validity and distance estimation values of the noisy coefficient) may be projected onto a spherical harmonic space (e.g., or spherical gaussian space).

In accordance with an embodiment, at operation 106 of the method 100, a data structure that includes the noisy lighting data in the second data representation (e.g., generated in operation 104) is associated with each light probe of the set of light probes. In accordance with an embodiment, the data structure may be a buffer such as a compute buffer. For example, noisy spherical harmonic coefficients for one or more light probes of the set of light probes may be placed in a compute buffer. In addition, the noisy spherical harmonic coefficients may be stored in each light probe. In accordance with an embodiment, the noisy lighting data may be equalized and normalized. For example, the noisy spherical harmonic coefficients may be equalized and normalized via a method described with respect to FIG. 2.

In accordance with an embodiment, at operation 108 of the method 100, a trained neural network (e.g., a deep neural network) uses the noisy lighting data in the second data representation (e.g., the data within the compute buffer) to produce denoised coefficients for the light probe. In accordance with an embodiment, the trained neural network may additionally use the depth estimations between a light probe and a nearest surface of an object in the environment to produce denoised coefficients for the light probe. The trained neural network may be trained according to a training method described below. In accordance with an embodiment, the trained neural network takes the noisy input data and estimates (e.g., infers) a non-noisy version of the noisy input data based on the training. In accordance with an embodiment, the depth estimates include an estimate of a distance between a light probe and a nearest surface of an object for a plurality of objects within the environment as determined or received within operation 102.

In accordance with an embodiment, at operation 110, the noisy lighting data (e.g., noisy coefficients) associated with the light probes is replaced by the denoised coefficients generated by the neural network (e.g., from operation 108).

In accordance with an embodiment, at operation 112, the denoised lighting data (e.g., the denoised coefficients) associated with the probes is used to render a scene from the environment. For example, the denoised lighting data associated with the probes may be used within a rendering pipeline to render images related to the 3D scene. The rendering in operation 112 may be performed in real-time (e.g., during game time within a video game) wherein data within the probes are used along with a current state of an environment (e.g., character positions/states, non-background object positions/states) to render an image of the 3D scene for the current state.

Figure 2:
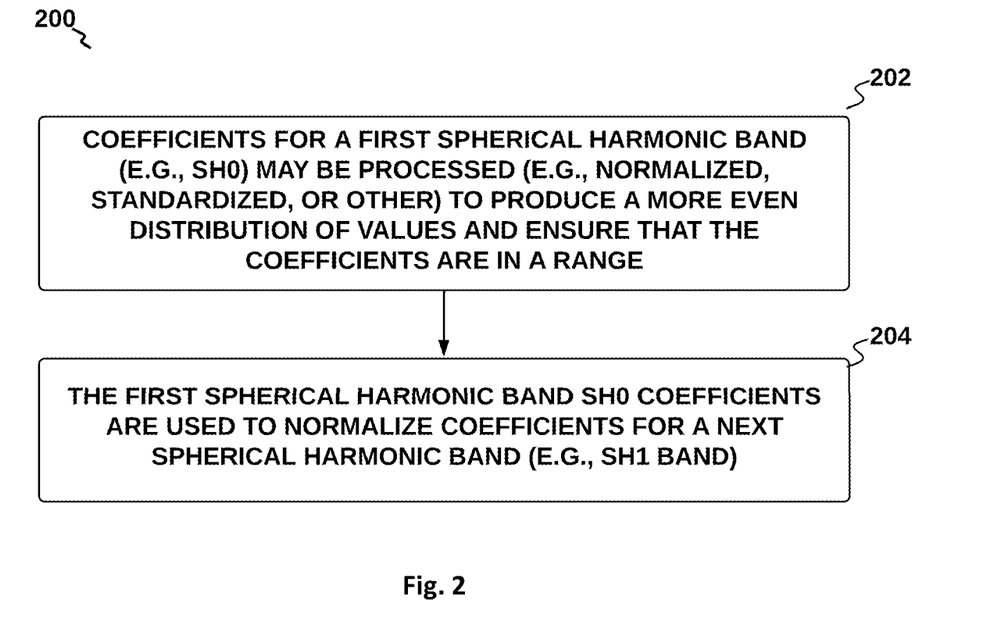
FIG. 2 is a flowchart of a method for standardizing a spheric harmonic space, in accordance with one embodiment.

In accordance with an embodiment, FIG. 2 shows a flowchart of a method 200 for standardizing a spheric harmonic space, based on the lighting data being projected onto the spherical harmonic space in operation 104. In accordance with an embodiment, at operation 202 of the method 200, a first spherical harmonic band (e.g., SH0 band) may be processed to generate a distribution of values which may be more evenly distributed (e.g., when compared to values before the processing), and which may include values within a predetermined range (e.g., 0 to 1), or have a different distribution. The processing may include scaling, normalization, standardization, histogram equalization or a combination thereof. The processing may be applied to coefficients associated with the SH0 band.

In accordance with an embodiment, at operation 204 of the method 200, the first spherical harmonic band SH0 coefficients may be used to normalize a second spherical harmonic band (e.g., a SH1 band), which may also generate an even distribution of coefficient values within the range of 0 to 1 (e.g., or within another predetermined normalized range).

Neural Network Training

In accordance with an embodiment, the trained neural network used in operation 108 may be trained using machine learning methods within a method similar to the method 100. During a training, similarly to the method 100, a noisy lighting data representation (e.g., noisy SH coefficients) is used as input to a neural network under training. During the training, a ground truth lighting data representation (e.g., high accuracy SH coefficients) is used as a target to compute a loss. The ground truth lighting data representation may include lighting data from a high accuracy optical simulation (e.g., a path tracer using a high sample count per probe which is allowed to converge to a high accuracy). The ground truth is a target the neural network under training learns to infer during the training. As part of the training, the neural network under training may be trained with a plurality of different noisy inputs for a single high accuracy target. Similarly, the neural network under training may be trained with a plurality of different high accuracy targets and a plurality of probe configurations (e.g., a plurality of different number of probes and a plurality of different probe distributions within an environment). Accordingly, to build a training dataset, many training examples of noisy inputs under different probe configurations are determined (e.g., simulated) for each high accuracy target.

Probe Distribution:

In accordance with an example embodiment, FIG. 3 is an illustration of an object 302 in an environment 300 (e.g., a scene) surrounded by a set of light probes 304 (e.g., which form a probe volume) as might be used with the method 100. In the example embodiment, the environment 300 includes a wall 306 and a floor 308 which may be part of a room within the environment 300. In the example shown, the light probes 304 are positioned in a way to capture light within the room; including the object 302. In accordance with an embodiment the light probes 304 may be positioned to gather light information from all parts of a scene, including parts which may be in direct shadow of a light source. The number and position of the light probes 304 shown in FIG. 3 is for simplicity of explanation only; any number of light probes 304 may be positioned in additional configurations within the environment 300 without departing from the scope of the disclosure herein. In addition, the light probes 304 are shown as being connected with dashed lines for simplicity of explanation only. While the shadow 310 of the object 302 shown in FIG. 3 appears to be created from a single light emanating from the top right of the environment 300, it should be understood by those skilled in the art that this does not limit the disclosure herein, and that light information from any number of light sources and of any type of light sources (e.g., direct light sources, indirect light sources, point light sources, extended light sources, and more) may be stored in each light probe, and used within the method 100.

In accordance with an example embodiment, FIG. 4 shows a rendered image of a room 400 using noisy input lighting data which may be generated as part of operation 102 (e.g., using a low sample density during optical simulation of lighting in the room 400). In accordance with an embodiment, though not shown in FIG. 4, a plurality of light probes are in the room and gather lighting data as part of operation 102. As part of the example room 400, there is a directional light (simulating the sun) coming through a window (not shown) in an alcove 420. In the example embodiment, due to the noisy input lighting data, multiple noisy shading patches 412 can be seen on the walls 410 of the room 400. The multiple noisy shading patches 412 are due to a rendering of the room 400 with the noisy input lighting data within the plurality of light probes. The noisy shading patches 412 are not physically realistic shadows and are an example of rough global illumination, which provides for a low quality rendered image.

In accordance with an example embodiment, FIG. 5 shows a second rendered image of the room 400 from FIG. 4, wherein the second rendered image uses denoised output lighting data which may be generated as part of operation 110. In the example second rendered image, due to the denoised output lighting data, a more physically realistic and smooth global illumination shading 512 is rendered on the walls 410 of the room 400. The more physically realistic and smooth global illumination shading 512 are due to a rendering of the room 400 with the denoised output lighting data (e.g., using the method 100) within the plurality of light probes.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
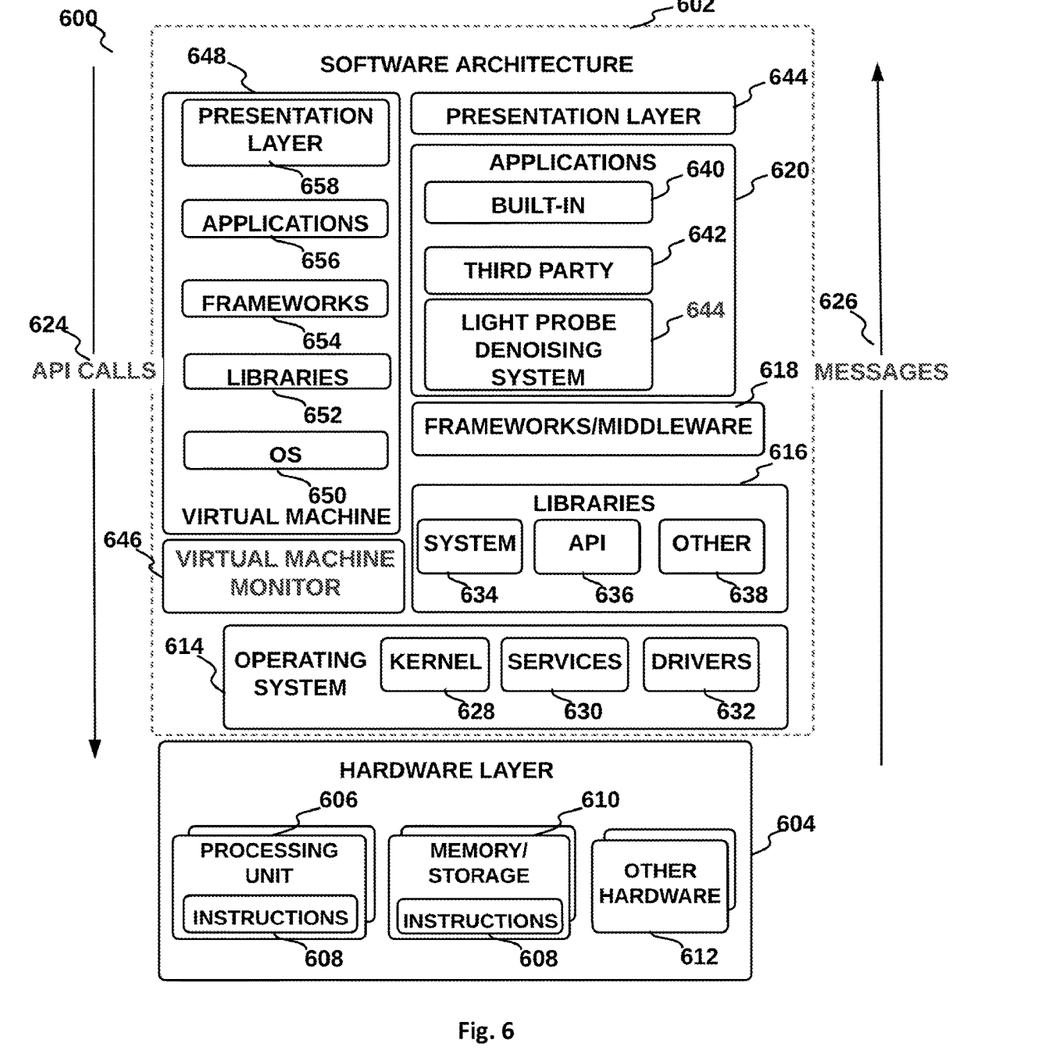
FIG. 6 is a block diagram illustrating an example software architecture, which may be used in conjunction with various hardware architectures described herein.

FIG. 6 is a block diagram 600 illustrating an example software architecture 602, which may be used in conjunction with various hardware architectures herein described to provide a gaming engine 601 and/or components of the light probe denoising system. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620 and a presentation layer 644. Operationally, the applications 620 and/or other components within the layers may invoke application programming interface (API) calls 624 through the software stack and receive a response as messages 626. The layers illustrated are representative in nature and not all software architectures have all layers. For example, some mobile or special purpose operating systems may not provide the frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 716 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 642 may invoke the API calls 624 provided by the mobile operating system such as operating system 614 to facilitate functionality described herein. In accordance with an embodiment, the built in applications 620 may include a light probe denoising system 644 that may carry out the method 100 described with respect to FIG. 1, FIG. 2, and FIG. 3.

The applications 620 may use built-in operating system functions (e.g., kernel 628, services 630 and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648 such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
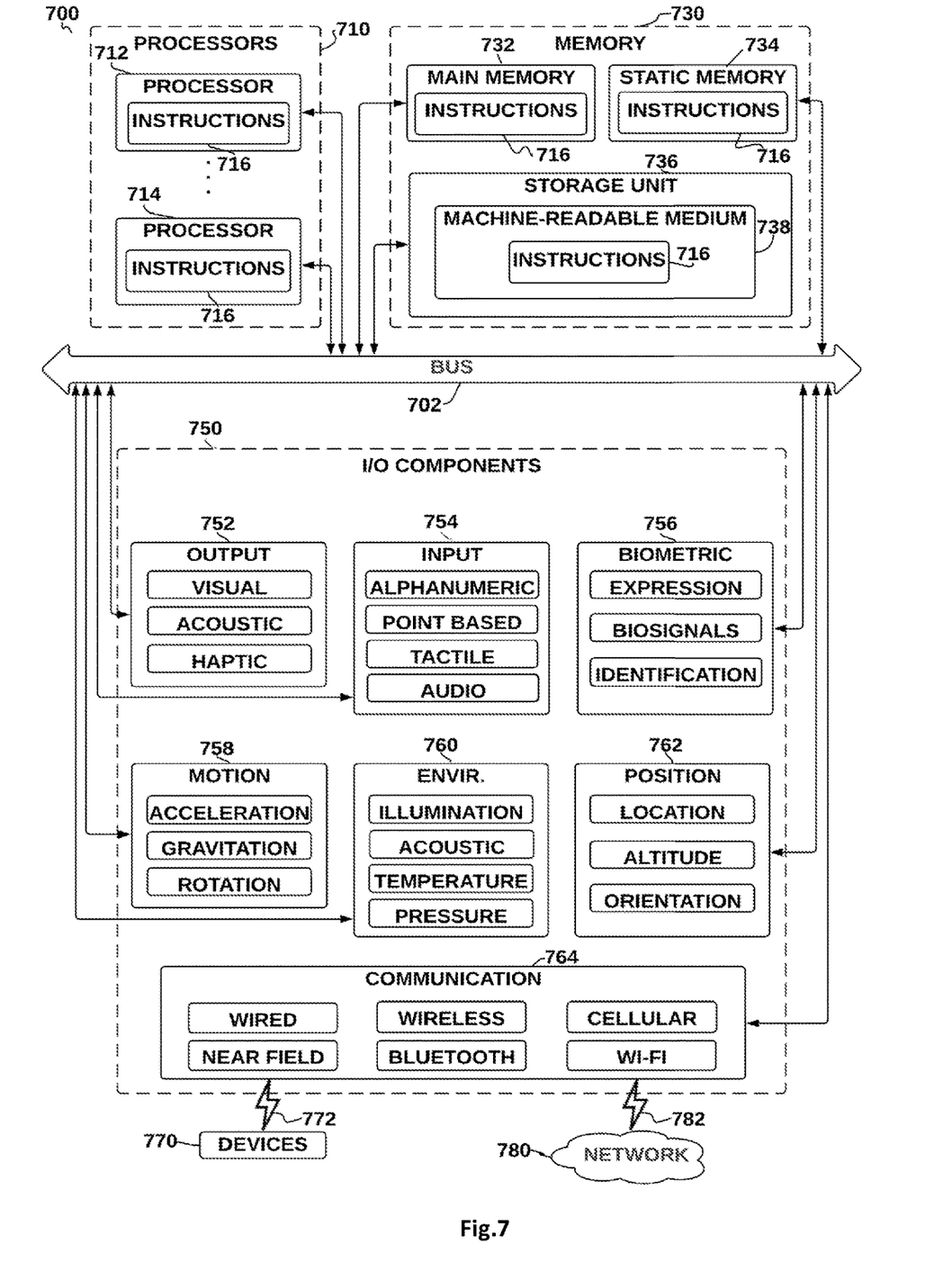
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of processors 710 are examples of machine-readable media 738.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific input/output (I/O) components 750 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 750 may include many other components that are not shown in FIG. 7. The input/output (I/O) components 750 are grouped according to functionality merely for simplifying the following discussion and the grouping is in no way limiting. In various example embodiments, the input/output (I/O) components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 762, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;
   one or more computer memories;
   a set of instructions incorporated into the one or more computer memories, the set of instructions configuring the one or more computer processors to perform operations, the operations comprising:
   accessing noisy lighting data in a data structure associated with a light probe in a set of light probes in an environment;
   providing the noisy lighting data as an input to a neural network, the neural network trained to output an estimate of non-noisy lighting data based on the input; and
   replacing the noisy lighting data in the data structure with the estimated non-noisy lighting data.

2. The system of claim 1, further comprising providing depth estimations between the light probe and a nearest surface of an object in the environment as an additional input to the trained neural network, and wherein the trained neural network is further trained to output the estimate of the non-noisy lighting data based on the additional input.

3. The system of claim 1, further comprising performing the training of the neural network to output the estimate, the performing of the training including providing a plurality of different noisy inputs for a high accuracy target, the high accuracy target based on a ground truth lighting data representation.

4. The system of claim 3, wherein the noisy inputs are associated with a plurality of probe configurations, each probe configuration including a different number of probes or a different distribution of the probes.

5. The system of claim 1, wherein the noisy lighting data is projected into the data structure from an additional data structure for ease of computation during rendering of the light probe.

6. The system of claim 5, wherein the data structure is a compute buffer.

7. The system of claim 5, wherein the projecting of the noisy lighting data into the data structure from the additional data structure includes projecting traced paths or validity and distance estimation values of a noisy coefficient onto a spherical harmonic space or a spherical gaussian space.

8. A non-transitory computer-readable storage medium storing a set of instructions that, when executed by one or more computer processors, cause the one or more computer processors to perform operations, the operations comprising:
   accessing noisy lighting data in a data structure associated with a light probe in a set of light probes in an environment;
   providing the noisy lighting data as an input to a neural network, the neural network trained to output an estimate of non-noisy lighting data based on the input; and
   replacing the noisy lighting data in the data structure with the estimated non-noisy lighting data.

9. The non-transitory computer-readable storage medium of claim 8, further comprising providing depth estimations between the light probe and a nearest surface of an object in the environment as an additional input to the trained neural network, and wherein the trained neural network is further trained to output the estimate of the non-noisy lighting data based on the additional input.

10. The non-transitory computer-readable storage medium of claim 8, further comprising performing the training of the neural network to output the estimate, the performing of the training including providing a plurality of different noisy inputs for a high accuracy target, the high accuracy target based on a ground truth lighting data representation.

11. The non-transitory computer-readable storage medium of claim 10, wherein the noisy inputs are associated with a plurality of probe configurations, each probe configuration including a different number of probes or a different distribution of the probes.

12. The non-transitory computer-readable storage medium of claim 8, wherein the noisy lighting data is projected into the data structure from an additional data structure for ease of computation during rendering of the light probe.

13. The non-transitory computer-readable storage medium of claim 12, wherein the data structure is a compute buffer.

14. The non-transitory computer-readable storage medium of claim 12, wherein the projecting of the noisy lighting data into the data structure from the additional data structure includes projecting traced paths or validity and distance estimation values of a noisy coefficient onto a spherical harmonic space or a spherical gaussian space.

15. A method comprising:
accessing noisy lighting data in a data structure associated with a light probe in a set of light probes in an environment;
providing the noisy lighting data as an input to a neural network, the neural network trained to output an estimate of non-noisy lighting data based on the input; and
replacing the noisy lighting data in the data structure with the estimated non-noisy lighting data.

16. The method of claim 15, further comprising providing depth estimations between the light probe and a nearest surface of an object in the environment as an additional input to the trained neural network, and wherein the trained neural network is further trained to output the estimate of the non-noisy lighting data based on the additional input.

17. The method of claim 15, further comprising performing the training of the neural network to output the estimate, the performing of the training including providing a plurality of different noisy inputs for a high accuracy target, the high accuracy target based on a ground truth lighting data representation.

18. The method of claim 17, wherein the noisy inputs are associated with a plurality of probe configurations, each probe configuration including a different number of probes or a different distribution of the probes.

19. The method of claim 15, wherein the noisy lighting data is projected into the data structure from an additional data structure for ease of computation during rendering of the light probe.

20. The method of claim 19, wherein the data structure is a compute buffer.

* * * * *